United States Patent
Barbosa

(10) Patent No.: US 9,991,012 B2
(45) Date of Patent: Jun. 5, 2018

(54) EXTRACTION PROCESS

(75) Inventor: Luis A. M. M. Barbosa, Alkmaar (NL)

(73) Assignee: MALLINCKRODT NUCLEAR MEDICINE LLC, Hazelwood, MO (US)

( * ) Notice: Subject to any disclaimer, the term of this patent is extended or adjusted under 35 U.S.C. 154(b) by 1384 days.

(21) Appl. No.: 13/878,252

(22) PCT Filed: Oct. 6, 2011

(86) PCT No.: PCT/US2011/055041
§ 371 (c)(1),
(2), (4) Date: Mar. 5, 2014

(87) PCT Pub. No.: WO2012/048077
PCT Pub. Date: Apr. 12, 2012

(65) Prior Publication Data
US 2014/0234186 A1 Aug. 21, 2014

(30) Foreign Application Priority Data
Oct. 7, 2010 (GB) .................................. 1016935.7

(51) Int. Cl.
*G21G 1/08* (2006.01)
*G21F 9/12* (2006.01)
(Continued)

(52) U.S. Cl.
CPC ............. *G21G 1/001* (2013.01); *B01D 15/08* (2013.01); *B01D 24/007* (2013.01);
(Continued)

(58) Field of Classification Search
CPC .. G21G 1/001; G21G 1/08; G21G 2001/0036; G21G 2001/0068; G21G 1/02;
(Continued)

(56) References Cited

U.S. PATENT DOCUMENTS 2,877,093 A * 3/1959 Tompkins ................ B01J 39/26
210/669
2,980,503 A * 4/1961 Healy ..................... C01D 17/00
423/2
(Continued)

FOREIGN PATENT DOCUMENTS

GB 949483 2/1964
JP 10030027 2/1998
(Continued)

OTHER PUBLICATIONS

Anyun Zhang et al, "Adsorption of cesium and some typical coexistent elements onto a modified macroporous silica-based supramolecular recognition material", Chemical Engineering Journal, Printed Feb. 15, 2010, pp. 58-66.*
(Continued)

*Primary Examiner* — Joseph Drodge

(57) ABSTRACT

A process for extracting Cs-137 from i) an acidic solution obtained by dissolving an irradiated solid target comprising uranium, ii) an acidic solution comprising uranium which has previously been irradiated in a nuclear reactor, or iii) an acidic solution comprising uranium which has been used as reactor fuel in a homogeneous reactor, the acidic solution i), ii) or iii) having been treated to harvest Mo-99, wherein the process comprises contacting the treated acidic solution with an adsorbent comprising ammonium molybdophosphate (AMP). In an embodiment, the AMP is combined with an organic or inorganic polymeric support, for example AMP synthesized within hollow aluminosilicate microspheres (AMP-C).

10 Claims, 1 Drawing Sheet

(51) Int. Cl.

| | |
|---|---|
| *B01D 15/08* | (2006.01) |
| *B01D 24/00* | (2006.01) |
| *B01J 20/02* | (2006.01) |
| *C02F 1/28* | (2006.01) |
| *C02F 1/62* | (2006.01) |
| *G21G 1/00* | (2006.01) |

(52) U.S. Cl.
CPC ....... *B01J 20/0211* (2013.01); *B01J 20/0218* (2013.01); *C02F 1/281* (2013.01); *C02F 1/62* (2013.01); *G21F 9/12* (2013.01); *G21G 1/08* (2013.01); *G21G 2001/0036* (2013.01); *G21G 2001/0068* (2013.01)

(58) Field of Classification Search
CPC ........ B01D 15/08; B01D 15/00; B01D 24/00; B01D 24/007; G21F 9/12; G21F 9/04; G21F 9/125; G21F 9/16; G21F 9/162; G21F 9/28; G21F 9/30; G21F 9/301; G21F 9/302; G21C 13/00; G21C 13/02; G21C 19/00; G21C 19/02; G21C 19/307; C22B 34/30; C22B 34/34; C22B 60/02; C22B 60/0204; C22B 60/0217; C22B 60/0226; C22B 60/0252; C22B 60/026; C22B 60/0278; C01G 43/003; C01G 43/006; C02F 1/28; C02F 1/281; C02F 1/42; C02F 1/62; C02F 2001/422; C02F 2001/425; B01J 20/02; B01J 20/0203; B01J 20/0211; B01J 20/0218
USPC ....... 210/634, 638, 639, 682, 259, 263, 511, 210/264, 683, 684, 688; 376/347, 361; 422/159; 423/2, 6, 8, 9, 10, 18, 20; 588/13, 15, 20
See application file for complete search history.

(56) References Cited

U.S. PATENT DOCUMENTS

| | | | | |
|---|---|---|---|---|
| 3,075,826 | A * | 1/1963 | Gray | G21F 9/007 423/11 |
| 3,228,848 | A * | 1/1966 | Fellows | B01J 19/081 204/157.15 |
| 3,322,509 | A * | 5/1967 | Vogg | C01D 17/00 423/11 |
| 3,359,078 | A * | 12/1967 | Alter | G21C 19/44 423/251 |
| 3,382,152 | A * | 5/1968 | Lieberman | C01G 39/00 23/313 AS |
| 3,425,924 | A * | 2/1969 | Kakihana | B01D 57/02 204/520 |
| 4,452,702 | A * | 6/1984 | Blasius | C02F 1/5272 210/638 |
| 4,544,499 | A * | 10/1985 | Tran | C03C 1/002 210/682 |
| 5,681,974 | A | 10/1997 | Hasegawa et al. | |
| 5,885,925 | A * | 3/1999 | DeFilippi | C01G 23/005 423/598 |
| 5,910,971 | A | 6/1999 | Ponomarev-Stepnoy | |
| 6,337,055 | B1 | 1/2002 | Betenekov et al. | |
| 6,649,037 | B2 * | 11/2003 | Liang | B01D 61/48 204/542 |
| 2003/0234223 | A1 * | 12/2003 | Kuraoka | B01D 15/424 210/660 |

FOREIGN PATENT DOCUMENTS

| | | |
|---|---|---|
| JP | 2004140977 | 5/2004 |
| KR | 20060017047 | 2/2006 |
| WO | 2011004382 | 1/2011 |
| WO | 2012018752 | 2/2012 |

OTHER PUBLICATIONS

"Fission Molybdenum for Medical Use", Proceedings of a Technical Committee Meeting Organized by the International Atomic Energy Agency held in Krlsruhe, Austria, Oct. 13-16, 1987, Printed by International Atomic Energy Agency, IAEA-TECDOC 515, Jun. 1989.*
Major C. Thompson, Savannah River Technology Center, "Pretreatment/Radionuclide Separations of CS/TC from Supernates", published in WSRC-MS-98-00601, 1998, pp. 1-12.*
R.J. Orth et al "Review and Assessment of Technologies for the Separation of Cesium from Acidic Media", Prepared for the U.S. Department of Energy, Pacific Northwest Laboratory, Richland, Washington, Sep. 1994.*
W. R. Walters et al, "Concentration of Radioactive Aqueous Wastes", Electromigration through ion-exchange membranes, Argonne National Laboratory, Lemont, Ill. Industrial and Engineering Chemistry, Jan. 1955.*
First Examination Report dated Nov. 10, 2014 for related AU Application No. 2011311992, 3 pages.
Second Examination Report dated Feb. 19, 2015 for related AU Application No. 2011311992, 3 pages.
First Examination Report dated Mar. 9, 2015 for related EP Application No. 11 773 620.7, 4 pages.
Ali et al. "Production Techniques of fission Molybdenum-99"; Radiochimica Acta 41; 1987; pp. 65-72.
Sebasta et al., "Homogeneous Aqueous Solution Nuclear Reactors for the Production of Mo-99 and other Short Lived Radioisotopes"; IAEA-TECDOC-947; 1997.
Todd et al., "A Comparison of Crystalline Silicotitanate and Ammonium Molybdophosphate—Polyacrylonitrile Composite Sorbent for the Separation of Cesium from Acidic Waste"; Radiochemistry; 2005, vol. 47, No. 4, pp. 398-402.
Faubel et al., "Separation of Cesium from Acid ILW-Purex Solutions by Sorption on Inorganic Ion Exchangers", Radiochimica Acta; 1986, 40, pp. 49-56.
Li et al., "Homogeneous Aqueous Solution Nuclear Reactors for the Production of Mo-99 and other Short Lived Radioisotopes"; IAEA-TECDOC-1601; Sep. 2008, p. 23.
Trantor et al, "An Inorganic Microsphere Composite for the Selective Removal of 127Cesium from Acidic Nuclear Waste Solutions", Jan. 2009, vol. 27, pp. 199-243.
Smit, "Ammonium Salts of the Heteropolyacids as Cation Exchangers", Nature, May 31, 1958, p. 1530-1531.
Office Action dated Apr. 25, 2017 in related CA Application No. 2813598, 4 pages.

* cited by examiner

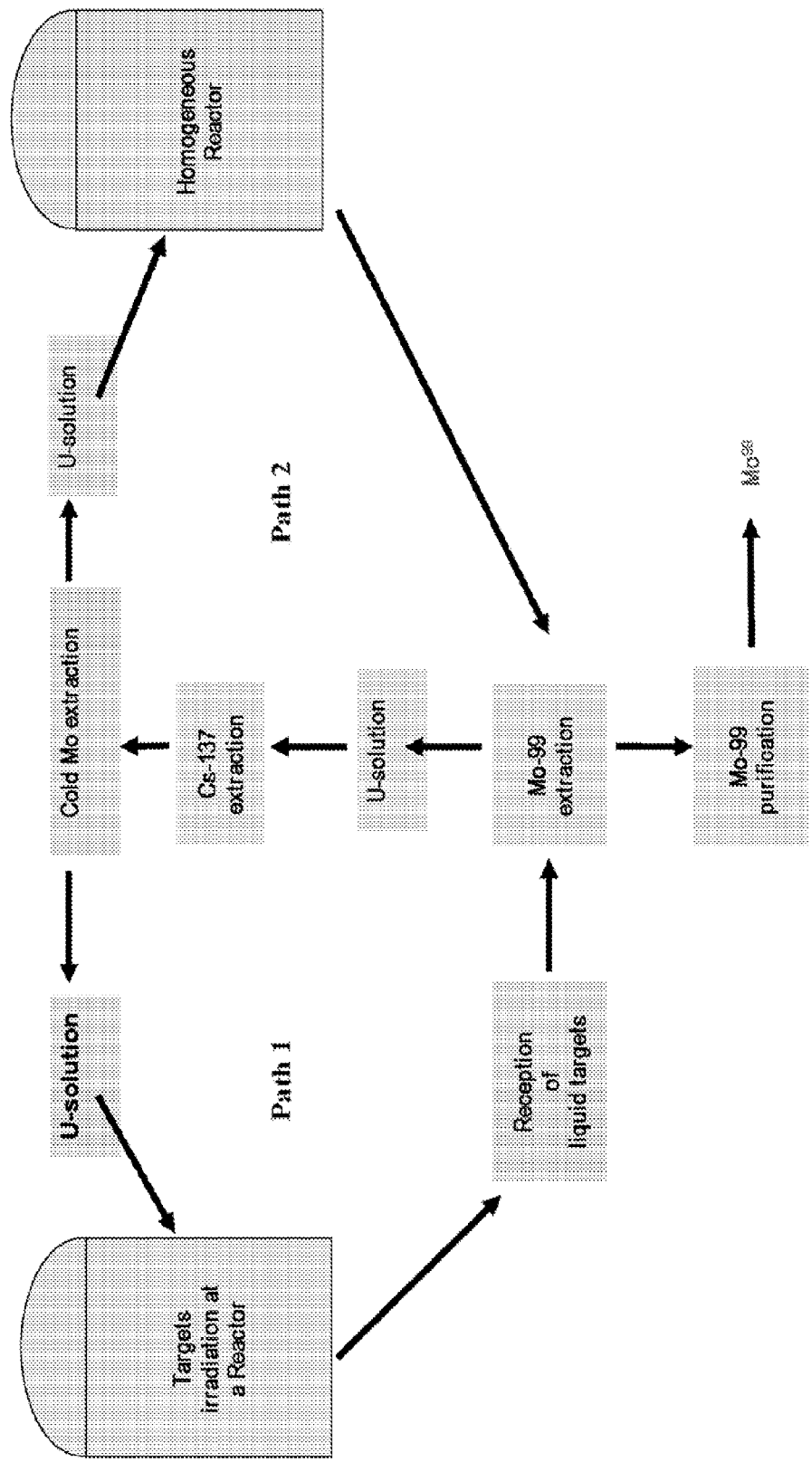

EXTRACTION PROCESS

This patent application is a U.S. National Stage of PCT/US2011/055041, filed 6 Oct. 2011, which is a non-provisional application of and claims the benefit of UK Patent Application No. 1016935.7 filed Oct. 7, 2010. Priority is claimed to each patent application set forth in this Cross-Reference to Related Applications section, and the entire disclosure of each such patent application which is incorporated herein in its entirety.

This invention relates to an extraction process. In particular, though not exclusively, it relates to a process for extracting Cs-137 from other materials present following Mo-99 production from uranium in nuclear fission reactors.

Technetium-99m is the most widely used radiometal for medical diagnostic and therapeutic applications. Tc-99m is prepared by decay of Mo-99 in so-called Tc-99m generators. Such a generator typically comprises an aqueous solution of Mo-99 loaded onto an adsorbent (usually alumina). Following decay of the Mo-99 to Tc-99m, which has a lower affinity for the alumina, the Tc-99m may be eluted, typically using a saline solution. For the preparation of Tc-99m generators, a high purity source of Mo-99 is therefore essential.

In order to obtain Mo-99 of high specific activity, it is commonly prepared by the neutron-induced fission of a U-235 target. U-235 is typically present in a target form of U-metal foil, or tubular constructs of U and Al. Alternatively, the U may be in solution in an acidic medium (such as in uranium solution targets, or as in the uranium solution used as fuel in a homogeneous reactor). The fission reaction leads to a proportion of the U-235 being converted to Mo-99, but also leads to a number of impurities in the reactor output. These impurities variously include Cs, Sr, Ru, Zr, Te, Ba, Al and alkaline and alkaline earth metals.

When Mo-99 is produced from the irradiation of solid or U-235 solution targets, or from U solution in a homogeneous reactor, the Mo-99 is harvested from the reactor output, and the resulting liquid waste streams need to be disposed of. In addition, when Mo-99 is produced from a U-solution in a homogeneous reactor, the homogeneous solution may be recycled a number of times to the reactor after Mo-99 extraction, prior to eventual disposal. The conventional means for the disposal of the waste streams is solidification followed by storage at a geological repository.

Most known processes for Mo-99 production employ a purification regime involving alkaline dissolution of the irradiated target; the resultant solution is then subjected to a series of chromatographic separations on various adsorbents to harvest the Mo-99 (Sameh and Ache, 1987).

A number of processes which use acid dissolution of the irradiated U targets have also been developed. Chalk River Nuclear Laboratories (Atomic Energy of Canada Limited) uses acid dissolution of tubular U—Al targets, and Mo-99 purification is carried out using an alumina adsorbent prior to subsequent purification steps. The Modified Cintichem process (carried out in BATAN, Indonesia), a process based on the Cintichem process and developed at Argonne National Laboratory, employs nitric acid dissolution of a U metal foil target, followed by precipitation of Mo-99 with benzoin-alpha-oxime.

The use of homogeneous reactors for the production of Mo-99 is far less common. An aqueous homogenous reactor (AHR) was developed by the Nuclear Power Institute of China (NPIC). This AHR uses $UO_2(NO_3)_2$ or $UO_2SO_4$ solution as the fuel and Mo-99 is extracted using one or two inorganic exchange columns (Li et al., 2008).

Caesium (Cs) is one of the key radioactive elements present as a contaminant in the waste stream. The most common radioactive isotope of Cs is Cs-137; this is formed as a fission product during irradiation of U. Cs-137 has a half-life of 30.07 years. This long-living isotope is a primary contributor to heat load and radiological dose in reactor waste materials. Removal of Cs-137 from the liquid waste streams facilitates easier handling and storage of the bulk waste at the repository. In addition, the accumulation of Cs-137 in cycled homogeneous reactor solutions has been found to cause problems in subsequent Mo-99 extraction steps. Therefore, removal of Cs-137 is an important step in the treatment of reactor output streams once Mo-99 has been extracted therefrom.

Ammonium molybdophosphate $(NH_4)_3P(Mo_3O_{10})_4.3H_2O$ (AMP) is a yellow crystalline inorganic compound that has been shown to be highly selective for Cs (Smit and Van, 1958). Faubel and Ali (1986) demonstrated that AMP is superior to other inorganic ion exchangers for removing Cs from solutions having high acid and salt concentrations (Faubel and Ali, 1986).

However, for AMP to be of any practical use for large-scale treatment, it must be fixed with a binding agent, substrate or support. Sebesta et al. (1997) developed a technique for combining AMP with an organic inert binding polymer, polyacrylonitrile (PAN), to create a composite absorber. A completely inorganic ion exchanger comprising AMP has also been prepared by precipitating AMP inside refractory aluminosilicate microspheres (AMP-C) (Tranter et al., 2009). Both AMP-PAN and AMP-C have been shown to be effective sorbents for the removal of Cs from Idaho National Engineering and Environmental Laboratory (INEEL) concentrated acidic tank wastes (Todd and Romanovskiy, 2005). The INEEL tank wastes comprise numerous components including Cs, Mo, Ca, Al, Fe, Hg and Na.

Nevertheless, none of the prior art documents suggests the use of an adsorbent comprising AMP for the extraction of Cs from a solution from which Mo has already been harvested.

In accordance with a first aspect of the present invention, there is provided a process for extracting Cs-137 from i) an acidic solution obtained by dissolving an irradiated solid target comprising uranium, ii) an acidic solution comprising uranium which has previously been irradiated in a nuclear reactor, or iii) an acidic solution comprising uranium which has been used as reactor fuel in a homogeneous reactor, the acidic solution i), ii) or iii) having been treated to harvest Mo-99, the process comprising contacting the treated acidic solution with an adsorbent comprising AMP.

The acidic solution i) may be obtained by dissolving an irradiated solid target comprising uranium in an acidic medium or an alkaline medium. Preferably, the acidic solution i) is obtained by dissolving an irradiated solid target comprising uranium in an acidic medium. In cases where alkaline dissolution of uranium targets is used, the resulting solution is thereafter acidified. Such an acidification step may take place before or after Mo-99 harvesting; if Mo-99 harvesting is to be performed using, for example, zirconium-containing adsorbents, acidification is performed prior to Mo-99 harvesting.

In some embodiments, the process further comprises a step of harvesting Mo-99 from the solution i), ii) or iii) prior to contacting said solution with the adsorbent comprising AMP. As mentioned above, if Mo-99 harvesting is performed using a solution i) obtained via acid dissolution of solid targets, the solution i) will be acidic. If on the other hand, Mo-99 harvesting is performed using a solution obtained via alkaline dissolution of solid targets, the solution from which Mo-99 is harvested will be alkaline, and needs to be acidified prior to contact with the AMP adsorbent. It is necessary, or at least preferable, to carry out the removal of Cs using adsorbents comprising AMP from liquid waste streams obtained from the production of Mo-99 once Mo-99 has been harvested from the waste streams. Otherwise, the Mo component present in the AMP material (i.e. cold Mo) may leach into and contaminate the streams containing the desired Mo-99 product. It will then be very difficult to separate the radioactive Mo-99 from the cold Mo.

The step of Mo-99 extraction can be carried out using any Mo purification methods known in the art, such as the approach of Sameh and Ache mentioned above. Other Mo purification methods include, but are not limited to, extraction using an adsorbent comprising hydrated titanium dioxide and zirconium hydroxide, e.g. for Mo-99 extraction from a homogeneous reactor as disclosed in U.S. Pat. No. 6,337,055. Other methods include the use of zirconium-containing sorbents, such as those containing zirconium oxide, zirconium hydroxide, zirconium alkoxide, zirconium halide and/or zirconium oxide halide, e.g. for Mo-99 extraction from solutions obtained by acid dissolution of U targets, irradiated acidic U solutions or from a homogeneous reactor solution, as described in co-pending GB application number 1013142.3. Certain zirconium-containing adsorbents, such as those based on zirconium oxide, halide and alkoxide components, are described in U.S. Pat. No. 5,681,974, JP 10030027, KR 20060017047 and JP 2004150977.

Once Mo-99 is removed from the reactor output streams, the resulting waste streams may be acidic or basic (depending on the Mo-99 extraction technique). When Mo-99 is harvested using an alkaline-based separation process, e.g. using the method described in the above-referenced document of Sameh and Ache, an additional step of acidification needs to be carried out. The process of Cs-137 extraction according to the present invention takes place using acidic solutions.

In the process of the present invention, the AMP may be combined with an organic or inorganic polymeric support. Preferably, the AMP is combined with an inorganic polymeric support, such as aluminosilicate. More preferably, the AMP is synthesised on the surface of aluminosilicate, and even more preferably the AMP is synthesised within hollow aluminosilicate microspheres (AMP-C). The material AMP-C may be prepared according to the method described by Tranter et al. (2009). In particular embodiments, the AMP-C may contain from 10-50 wt % of AMP, such as 10-30 wt %, or 15-25 wt %, more preferably 20-25 wt %.

In certain embodiments of the first aspect in which Mo-99 production is carried out in an AHR, the Cs-137-depleted waste solution (i.e., after having been contacted with the adsorbent comprising AMP) is returned to the homogeneous reactor. As mentioned above, the accumulation of Cs-137 in the homogeneous reactor solution causes problems for the subsequent purification of Mo-99. Therefore, the process according to the first aspect of the present invention is particularly useful in the context of Mo-99 production in a homogeneous reactor.

Similarly, when Mo-99 production is carried out in a nuclear reactor in which a solution comprising uranium is irradiated, the Cs-137-depleted waste solution may be returned to the nuclear reactor.

For the purpose of the present invention, the term "Cs-137-depleted solution" refers to a solution which has undergone the Cs-137 extraction process according to the first aspect of the present invention. Such a Cs-137-depleted solution contains a lesser amount of Cs-137 than a solution, subjected to the same irradiation (and dissolution, as necessary) procedures, and which has not undergone the Cs-137 extraction process. Preferably, the Cs-137-depleted solution contains only 90% or less, 80% or less, 70% or less, 60% or less, or 50% or less of the amount of Cs-137 contained in the solution prior to AMP treatment; in preferred embodiments, the Cs-137-depleted solution contains 40% or less, 30% or less, 20% or less, 10% or less, 5% or less, or 1% or less of the Cs-137 contained in the solution prior to AMP treatment.

In a preferred embodiment of the first aspect, the process further comprises a step of removing Mo, leached from the AMP (i.e. cold Mo), from the Cs-137-depleted solution prior to its return to the homogeneous reactor or the nuclear reactor in which a solution comprising uranium is irradiated. This additional step ensures that cold Mo leached from the AMP does not contaminate the radioactive Mo-99 produced in the homogeneous reactor or by the irradiation of U-solution targets.

The step of removing cold Mo from the Cs-137-depleted solutions can be carried out using any suitable known method for extracting Mo-99, such as those mentioned above. Preferably, the method comprises contacting the said Cs-137-depleted solution with a zirconium-containing sorbent. For example, the sorbents commercially available from Thermoxid Scientific & Production Co. (Zorechnyi, Russian Federation), marketed as Radsorb and Isosorb (both based on $TiO_2/ZrOH$), and described in U.S. Pat. No. 6,337,055, may be used.

In accordance with a second aspect of the present invention, there is provided an apparatus for carrying out the process of the first aspect, the apparatus comprising a vessel containing an adsorbent for the extraction of Mo-99, and a vessel containing an adsorbent comprising AMP and arranged in downstream fluid communication with the vessel containing the adsorbent for extraction of Mo-99.

Following the irradiation of solid or U-235 solution targets, or from U solution in a homogeneous reactor, the resulting solution containing Mo-99 and other fission products, such as Cs-137, may be removed from the reactor and transferred to a facility to harvest Mo-99 using an apparatus according to the second aspect of the present invention. The solution containing Mo-99 and impurities may be transferred via suction under-pressure to a vessel containing an adsorbent for the extraction of Mo-99 and arranged upstream and in fluid communication with a vessel containing an adsorbent comprising AMP, such that the Mo-99-harvested solution is treated to extract Cs-137.

In some embodiments, the apparatus further comprises a nuclear reactor, in which a solution comprising uranium may be irradiated for the production of Mo-99, or more preferably a homogeneous reactor (e.g. an aqueous homogeneous reactor), which uses a solution comprising uranium as reactor fuel for the production of Mo-99, wherein the reactor has a valve at its outlet, the vessel containing an adsorbent for the extraction of Mo-99 is arranged in downstream fluid communication with the valve, and the vessel containing an adsorbent comprising AMP is arranged in downstream fluid communication with the valve and in downstream fluid communication with the vessel containing an adsorbent for the extraction of Mo-99. Such an arrangement not only allows the production (irradiation) and harvesting of Mo-99 as well as the treatment of the liquid waste streams to take place in the same facility, but also makes it possible for the Cs-137-depleted solution to be returned to the reactor.

In such embodiments, the vessel containing an adsorbent comprising AMP may be in downstream fluid communication with the valve both directly and via the vessel containing an adsorbent for the extraction of Mo-99. Accordingly, when the valve is in a first position, the vessel containing an adsorbent comprising AMP is in direct downstream fluid communication with the valve, and when the valve is in a second position, the vessel containing an adsorbent comprising AMP is in downstream fluid communication with the valve via the vessel containing an adsorbent for the extraction of Mo-99.

During use of the apparatus according to these embodiments, when the valve is in the first position, the vessel containing an adsorbent comprising AMP is in direct downstream fluid communication with the valve, such that the reactor solution flows directly from the reactor to the vessel containing the AMP adsorbent, which may then be returned to the reactor. When the valve is switched to the second position, the reactor solution flows from the reactor to the vessel containing an adsorbent for the extraction of Mo-99, and subsequently to the vessel containing an adsorbent comprising AMP, the output of which may ultimately be returned to the reactor.

In certain embodiments of the second aspect, the apparatus further comprises a vessel containing an adsorbent for removing Mo, leached from the AMP (i.e. cold Mo), in downstream fluid communication with the vessel containing an adsorbent comprising AMP.

The adsorbents used in the second aspect for the extraction of Mo-99 or cold Mo, and the adsorbent comprising AMP for the extraction of Cs-137, may be any of the adsorbents mentioned for the first aspect.

In preferred embodiments of the second aspect of the present invention, at least one of the vessels containing Mo-99 adsorbent and AMP is a column having an inlet and an outlet. Preferably, both vessels are of this type. In certain embodiments, the vessel containing an adsorbent for cold Mo may also be a column having an inlet and an outlet.

The adsorbent for extraction of Mo-99 or cold Mo and the adsorbent comprising AMP for extraction of Cs-137 according to the second aspect of the invention can be any suitable adsorbent known in the art, and examples of such adsorbents are mentioned in relation to the first aspect. Preferably, the adsorbent for extraction of Mo-99 or cold Mo is a zirconium/titania-containing adsorbent, such as Radsorb or Isosorb.

In accordance with the present invention, once the adsorbent comprising AMP is loaded with Cs-137, for example to such a degree that its Cs adsorption capacity is significantly impaired, the adsorbent can be replaced. In this way, the Cs-137 extracted from the waste solution is contained in a small and compact solid form which is cheaper and easier to handle than prior art waste streams containing Cs-137 in solution.

The invention will now be described in more detail by way of example only, and with reference to the appended FIG. 1, which shows a schematic diagram of an exemplary process of the invention.

The invention provides for the decontamination of an acid stream obtained from i) the dissolution of high enriched or low enriched U-targets (dispersed or non dispersed/U-metal foil), ii) the irradiation of a high enriched or low enriched U-solution in nuclear reactors, or iii) a high enriched or low enriched U-solution used as fuel in a homogeneous reactor, the acid stream having been treated to extract Mo-99, by removing Cs-137 using an adsorbent comprising AMP. The invention leads to liquid waste streams with small or negligible amounts of Cs-137 and a compact solid form of Cs-137, both of which are cheaper and easier to handle than the untreated liquid waste streams.

EXAMPLE 1. URANYL SOLUTION IRRADIATION PROCESS

An amount of uranyl nitrate solution, with a given concentration of U, for instance 150 g/L, is irradiated in a nuclear reactor (see Path 1 of FIG. 1). The final solution, which contains Mo-99 among other isotopes, is conducted through a column, which retains Mo-99 with traces of U and other fission products (FIG. 1—"Mo-99 extraction"). The column is then washed with a solution of $0.1M$ $HNO_3$ with a volume corresponding to eight column bed volumes. This enables almost all U retained in the column to be washed out so that the adsorbed Mo-99 can be harvested in subsequent purification steps. The U-containing loading solution exiting from the Mo-99 extraction column, and the rinsing solutions used in this column, are then treated to extract Cs-137 by flowing them through another column comprising an AMP-C sorbent using an appropriate flow rate to obtain a balance between process time and Cs-137 extraction efficiency. The Cs-137-depleted waste solution is then passed through a column comprising a zirconium/titania-containing sorbent to capture any cold Mo leached from the AMP-C sorbent. As will be appreciated by those skilled in the art, the two columns for extraction of Cs-137 and cold Mo may be combined in a single column having two separate compartments. The resulting solution is then recycled to the reactor and re-irradiated to produce further Mo-99.

EXAMPLE 2. HOMOGENEOUS REACTOR

Uranyl nitrate ($UO_2(NO_3)_2$) solution follows the same procedure as described in U.S. Pat. No. 5,596,611 to harvest Mo-99 (FIG. 1—"Mo-99 extraction"). The Mo-99-harvested solution, together with the rinsing solutions containing U, are then purified by employing the above described procedure (see Path 2 of FIG. 1). Since the homogeneous reactor solution has a much greater volume than that obtained from irradiation of U solution targets in a nuclear reactor, the amount of sorbents are adjusted, as well as the solution flow rate to maintain the appropriate contact time and extraction efficiency.

REFERENCES

Faubel and Ali, *Radiochimica Acta,* 1986, 40, p 49-56;
Li et al., IAEA-TECDOC-1601, September 2008, p 23;
Sameh and Ache, *Radiochim. Acta,* 1987, 41, p 65;
Sebesta, IAEA-TECDOC-947, 1997;
Smit and Van, J., Nature, 1958, p 1530;
Todd and Romanovskiy, Radiochemistry, 2005, 47, 4, p 398-402;
Tranter et al., Solvent Extraction and Ion Exchange, 2009, 27, p 199-218;

The invention claimed is:
1. A process for extracting Cs-137 from i) an acidic solution obtained by dissolving an irradiated solid target comprising uranium, ii) an acidic solution comprising uranium which has previously been irradiated in a nuclear reactor, or iii) an acidic solution comprising uranium which has been used as reactor fuel in a homogeneous reactor, the process comprising
  (a) harvesting Mo-99 from the solution i), ii) or iii) prior to extracting Cs-137,

(b) contacting the acidic solution from step (a) with an adsorbent comprising ammonium molybdophosphate (AMP) to extract Cs-137, and (c) when the solution is solution ii) or solution iii), returning the depleted Cs-137 solution from step (b) to the nuclear reactor or the homogenous reactor;

wherein harvesting Mo-99 from the acidic solution prior to step (b) prevents the Mo component present in the AMP from leaching into and contaminating the Mo-99.

2. A process according to claim 1, wherein the AMP is combined with an organic or inorganic polymeric support.

3. A process according to claim 2, wherein the AMP combined with an inorganic polymeric support is AMP that is synthesised within hollow aluminosilicate microspheres (AMP-C).

4. A process according to claim 1, wherein Mo-99 is harvested from solution ii) or iii) in step (a), and the process further comprises a step of removing Mo, leached from the AMP, from the Cs-137-depleted solution prior to its return to be irradiated in the nuclear reactor, or prior to its return to the homogeneous reactor.

5. A process according to claim 4, wherein the step of removing Mo, leached from the AMP, from the Cs-137-depleted solution comprises contacting said Cs-137-depleted solution with a zirconium-containing sorbent.

6. The process of claim 5, wherein the zirconium-containing sorbent is a zirconium/titania-based sorbent.

7. An apparatus for carrying out the process of claim 1, the apparatus comprising a vessel containing an adsorbent for the extraction of Mo-99, a source of the uranium containing acidic solution of claim 1 arranged in fluid communication with the vessel containing an adsorbent for the extraction of Mo-99, and a vessel containing an adsorbent comprising ammonium molybdophosphate (AMP) and arranged in downstream fluid communication with the vessel containing the adsorbent for extraction of Mo-99.

8. An apparatus according to claim 7, further comprising a nuclear reactor for the production of Mo-99, wherein the nuclear reactor has a valve at its outlet, the vessel containing an adsorbent for the extraction of Mo-99 is arranged, and the vessel containing an adsorbent comprising AMP is arranged in downstream fluid communication with the valve and in downstream fluid communication with the vessel containing an adsorbent for the extraction of Mo-99.

9. An apparatus according to claim 7, further comprising a homogeneous reactor, which uses a solution comprising uranium as reactor fuel for the production of Mo-99, wherein the homogeneous reactor has a valve at its outlet, the vessel containing an adsorbent for the extraction of Mo-99 is arranged, and the vessel containing an adsorbent comprising AMP is arranged in downstream fluid communication with the valve and in downstream fluid communication with the vessel containing an adsorbent for the extraction of Mo-99.

10. An apparatus according to claim 7, the apparatus further comprising a vessel containing an adsorbent for removing Mo, leached from the AMP, in downstream fluid communication with the vessel containing an adsorbent comprising AMP.

* * * * *

UNITED STATES PATENT AND TRADEMARK OFFICE
CERTIFICATE OF CORRECTION

Page 1 of 1

PATENT NO.         : 9,991,012 B2
APPLICATION NO.    : 13/878252
DATED              : June 5, 2018
INVENTOR(S)        : Luis A. M. M. Barbosa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1459 days.

Signed and Sealed this
Fourteenth Day of August, 2018

Andrei Iancu
*Director of the United States Patent and Trademark Office*